(12) United States Patent
Reiner

(10) Patent No.: US 8,617,660 B2
(45) Date of Patent: Dec. 31, 2013

(54) REMOVABLE PROTECTIVE LIP ON A WIPING ELEMENT

(75) Inventor: Sebastian Reiner, Isen-Burgrain (DE)

(73) Assignee: Trelleborg Sealing Solutions Germany GmbH, Stuttgart (DE)

( * ) Notice: Subject to any disclaimer, the term of this patent is extended or adjusted under 35 U.S.C. 154(b) by 0 days.

(21) Appl. No.: 13/466,139

(22) Filed: May 8, 2012

(65) Prior Publication Data

US 2012/0219716 A1    Aug. 30, 2012

Related U.S. Application Data

(63) Continuation of application No. 12/087,685, filed as application No. PCT/DE2007/000026 on Jan. 11, 2007, now abandoned.

(30) Foreign Application Priority Data

Jan. 18, 2006   (DE) .......................... 10 2006 002 347

(51) Int. Cl.
   *B05D 3/12* (2006.01)
   *F16J 15/56* (2006.01)
(52) U.S. Cl.
   CPC ....................................... *F16J 15/56* (2013.01)

USPC ............ 427/356; 15/256.5; 118/56; 118/120; 118/213; 118/504; 118/505; 427/282

(58) Field of Classification Search
   USPC ........... 15/256.5; 118/56, 120, 213, 504, 505; 277/572; 427/282, 356
   IPC .................. B05B 15/045,15/0456; F16J 15/56, F16J 15/3268
   See application file for complete search history.

(56) References Cited

U.S. PATENT DOCUMENTS 5,603,509 A * 2/1997 Stoll et al. ..................... 277/550

* cited by examiner

*Primary Examiner* — Alexander Weddle
(74) *Attorney, Agent, or Firm* — Paul Vincent

(57) ABSTRACT

A wiping element made of a rubber-elastic or ductile-elastic material for the protection of components mobile against one another, wherein at least one wiping lip (2) is provided on a wiping ring (1). The wiping element has a protective lip (4), which is or can be fixed in a detachable fashion to the wiping ring (1). In a wiper arrangement (10), the wiping ring (1) is arranged position-stable on a first component and lies with the wiping lip (2) and the protective lip (4) adjacent to a second component. With the use of such a wiper arrangement (10) for the painting of components mobile against one another, at least one component is painted in the fixed state of the protective lip (4) and the protective lip (4) is then detached from the wiping ring (1).

14 Claims, 1 Drawing Sheet

REMOVABLE PROTECTIVE LIP ON A WIPING ELEMENT

This application a continuation of Ser. No. 12/087,685 filed Jul. 11, 2008 now abandoned as the national stage of PCT/DE2007/000026 filed on Jan. 11, 2007 and also claims Paris Convention priority of DE 10 2006 002 347.1 filed on Jan. 18, 2006, the entire disclosures of which are hereby incorporated by reference.

BACKGROUND OF THE INVENTION

The invention relates to a wiping element made from a rubber-elastic or ductile-elastic material for the protection of components mobile against one another, at least one wiping lip being provided on the wiping element, wherein the wiping element has a protective lip, which is provided in a detachable fashion on the wiping element.

A wiping element of this kind has become known in the art for example by means of DE 86 15 170 U1. In order to seal an axially moving component such as a piston rod, a sealing lip and a wiping lip of the wiping element seats on that component. The sealing lip on the side of the medium wipes the film of medium located on the component during axial motion of that component. The side of the wiping lip exposed to atmosphere prevents the entrance of solid materials such as chips or soiling and their passage to the medium side. The additional protective lip can be removed but is otherwise connected to the wiping element in an integral manner to constitute a single unit, which can be installed. A holding edge of the protective lip is inserted or snapped into a support opening formed on the wiping element and is held on the mounted wiping element in this fashion. During use, the conventional wiping element seats with its protective lip on the component as a result of which impurities, in particular ice, can be scraped off.

US 2005/0067242 A1 concerns a sealing system for a shock absorber in a motor vehicle. A wiping element and a sealing element are disposed between a guiding rod and a piston rod in order to hold hydraulic liquid in the shock absorber and to prevent foreign particles as well as soiling from entering into the shock absorber. A wiping lip and a sealing lip of the wiping element seat on the piston rod. The side of the wiping element associated with the wiping lip has an associated protective lip, which is directed towards the outer side of the shock absorber. The protective lip is made from a hard plastic and engages at one end into a ring-shaped groove on the wiping element and, on the other end, seats on the piston rod for wiping off dirt, water, or foreign particles therefrom.

DE 44 08 408 C1 discloses a wiping element, which includes a wiping ring with a lip and a protective ring, which is integral with the wiping ring. The wiping element surrounds a piston rod and seats with its wiping lip on the piston rod to prevent the entrance of impurities in that soiling which adheres to the outer periphery of the piston rod is wiped off. In order to wipe off particles, which adhere more strongly to the piston rod, this wiping element can be equipped with an upstream protective lip made from a harder plastic material. During use, the protective lip of the wiping element also seats on the outer periphery of the piston rod. Projections are formed on the outer side of the wiping element for attachment of the protective lip which project through openings and recesses in the protective lip. The protruding end sections of the projections are preferentially re-formed into wide heads under the introduction of heat and constitute a rivet-like connection between the protective lip and the wiping element.

Wiping elements are used in systems of components mobile against one another in order to protect the latter against the entry of foreign substances. The wiping element is as a rule arranged upstream of a further seal. The wiping lip provided on the wiping element lies adjacent to the component which is exposed to the ambient conditions in the extended state and wipes off particles of dirt, ice, water and other foreign substances adhering to the component, before the component is retracted into the system again. In a cylinder-piston unit, the piston rod to be retracted is kept free from foreign substances by a wiping element. Wiping elements are described for example in the textbook "Heinz Konrad Müller, Abdichtung bewegter Maschinenteile, Medienverlag, 1990" (page 192) and are known as part of a wiper arrangement from DE 196 39 798.

The systems protected by wiping elements are often hydraulic. Foreign particles that have entered into a hydraulic system can lead to damage to seals, guides, valves and pumps. The components mobile against one another may also be damaged. The foreign particles can for example get under a downstream seal lying adjacent to a component under high pressure and, during the counter-movement of the components, damage at least one of the components. Furrows thus arise on the piston rod in a cylinder-piston unit during the retraction and extension of the piston rod. The furrows on the piston rod can in turn damage the wiping lip of a wiping element arranged upstream and thus impair the wiping element in its function.

The penetration of foreign substances is largely prevented by suitable wiping elements in the running operation of a hydraulic system. Damage and contamination on external areas of retracted components can however also occur before commissioning, in particular during transport and during assembly.

Systems of components mobile against one another such as a cylinder-piston unit are transported as a rule with a wiping element already assembled. For the purpose of protection against corrosion, the external area of a retracted component, for example the external piece of a piston rod, is wetted with wax or grease.

The components of a hydraulic system are as a rule painted after assembly. In the painting process, paint particles can get into the region of components whose surfaces are to be sealed against one another under high pressure. Due to temperature differences occurring in the course of the painting process, a component may be traversed to a differing extent against an adjacent component, as a result of which a drift area adjacent to the wiping element arises. The drift area of the component and the paint particles adhering to it are introduced into the hydraulic system following the painting process due to a cooling-related retraction of the component. The paint particles, like other foreign substances, have the initially described harmful effects on a hydraulic system. A hydraulic system can thus already be contaminated with foreign particles before commissioning, as a result of which the functionality of the wiping and sealing elements and the overall system may be impaired.

External areas of retracted components adjacent to the wiping element, in particular the drift area, are protected during painting with the aid of an upstream element, for example, an adhesive tape, a molded part or an O-ring. After the painting process, the protective devices are removed.

The problem underlying the invention is to protect, in a straightforward manner, external areas of a traversable component adjacent to a wiping element in a system of components mobile with respect to one another during transport and installation, wherein, in particular, the protective device can be easily removed.

SUMMARY OF THE INVENTION

According to the invention, the problem is solved by a wiping element of the above-mentioned kind, in that at least one removal aid is provided on the protective lip for removing the protective lip from the wiping element.

Such a detachment aid can be gripped and pulled away in the detachment procedure and thus facilitates removal of the protective lip. A detachment aid is especially suitable for breaking through a firm bond or a perforation at one point and then detaching the complete attachment of the protective lip by pulling on the detachment aid.

The protective lip is provided on the wiping element in a detachable fashion, as a result of which the advantage arises that the protective lip can be detached and removed from the wiping element after use, i.e. after transport or after painting of the components mobile against one another. Removal of the protective lip requires a small amount of work compared with conventional protective devices.

In a preferred development of the wiping element according to the invention, at least one the removal aid is fashioned as a grip or strap. A grip or a strap provided on the protective lip makes for easier handling during detachment of the protective lip from the wiping element.

The protective lip provided on the wiping element is arranged upstream of a wiping lip and like the wiping lip also lies adjacent to the component to be protected, so that the protective lip covers the area of the component lying between the contact line of the protective lip and the contact line of the wiping lip and said area is protected against influences from the environment such as corrosive or paint particles.

The protective lip simplifies transport, assembly and commissioning of a system of components mobile against one another. The protective lip can already be fixed to the wiping element during transport, as a result of which the use of additional preservation agents is not necessary. The wiping element is fitted together with the protective lip on a component before painting.

In a preferred embodiment of the wiping element according to the invention, the protective lip is produced from a rubber-elastic or ductile-elastic material, preferably the same material as the wiping element, softer or harder than the material of the wiping element.

Rubber-elastic and ductile-elastic materials and composites of both types of material are suitable for the production of wiping elements and for making reliable wiping lips available. A protective lip produced from such a material exhibits the same properties as a correspondingly produced wiping lip, in particular it sits close to a component. A wiping element, whose protective lip and wiping lip are produced from the same material, is easy to handle on account of uniform elasticity and flexibility and lies with both lips adjacent to a component in the same way. A protective lip that is produced from a softer material than the material of the wiping element has an advantageous sealing behavior in respect of low-viscous liquids and in respect of very small particles. The production of the protective lip from a material which is harder than the material of the wiping element offers the advantage that such a protective lip, as a more solid composite piece, can easily be detached from the wiping element.

In a preferred development of the wiping element according to the invention, the protective lip is fixed by a firm bond to the wiping element, the firm bond being embodied uninterrupted or in segments, preferably as a perforation.

The advantage of this development lies in the fact that, as a result of the firm bond between them, the protective lip and the wiping element form a unit which can be manufactured in the same production process and, in addition, assembled in a single step. The penetration of paint particles or other foreign substances at the fixing edge between the protective lip and the wiping element is eliminated with an uninterrupted firm bond, as a result of which the protective lip performs its function in an ideal manner. On the other hand, a segment-like attachment of the protective lip is advantageous for the detachment of the protective lip from the wiping element. A perforation unifies the advantages of the two forms of embodiment, since a firm bond embodied as a perforation at comparatively small sub-zones is permeable to particles and, due to a connection of the protective lip and wiping element being present only in sections, guarantees easy detachment of the two shaped parts.

In a further development of the wiping element according to the invention, means for the attachment of the protective lip are provided on the wiping element and/or on the protective lip, the attachment of the protective lip taking place by means of positive locking.

With this embodiment, the wiping element and the protective lip are present as separately produced shaped parts. The attachment of the protective lip to the wiping element takes place by means of positive locking of suitable means, which are provided on the wiping element, the protective lip or on both shaped parts. The positive locking arising through the joining of suitable attachment means prevents, in a similar fashion to a firm bond, the penetration of particles through the joining seam. A protective lip attached by positive locking can easily be detached from the wiping element. The attachment means are as a rule not damaged by joining and by a subsequent detachment. Resulting from this is the advantage that the protective lip can be replaced when required, for example in the case of a protective lip severely contaminated or damaged during transport, which is to be used further for protection during the painting process. Furthermore, a protective lip to be attached and removed in a positive locking manner can be used repeatedly.

Furthermore, the protective lip preferably comprises one or more projections and the sealing element comprises recesses corresponding to the shape of the projections.

The attachment of the protective lip takes place in this embodiment by clipping into or onto one another or latching projections and recesses formed on the wiping element and/or the protective lip. In order to achieve a firm attachment of the protective lip, the recesses are formed for example in such a way that they are each engaged from behind by a corresponding projection and thus each form a dovetail joint. A zipper-like joining seam between the protective lip and the wiping element is formed in an arrangement of the projections and the recesses at regular intervals along the edge of the wiping element and, respectively, along the protective lip.

In a preferred development of the wiping element according to the invention, the protective lip in the fixed state overlaps the wiping element at least partially.

The partial areas of the wiping element overlapped by the protective lip are protected, as is the protected area of the piston rod, against corrosive particles during transport and paint particles during a painting process. The attachment of an overlapping protective lip preferably takes place at an inner line of the protective lip.

The invention further comprises a wiper arrangement with a wiping element according to the invention and at least two components mobile against one another, wherein the wiping element is arranged position-stable on a first component and lies adjacent to a second component.

In the wiper arrangement according to the invention, the wiping element is arranged along the sealing gap formed by two components mobile against one another. The components can be parts of a machine or a gear unit. The wiping element is held on the first component, for example in a groove. The wiping lip and the protective lip lie adjacent to the second component, so that the area of the second component lying between the contact lines of the two lips is covered by the protective lip and largely protected against ambient influences. A wiping element with an overlapping protective lip is advantageous for such a wiper arrangement, since an overlapping protective lip can lie adjacent to both components and can thus cover the whole sealing gap.

The wiping element lies in an annular fashion on the second component in a preferred embodiment of the wiper arrangement according to the invention.

The wiping element used in this wiper arrangement is closed in an annular fashion and represents a so-called wiping ring, which engages around the second component and lies adjacent to its whole circumference. Emerging from this is the advantage that the protective lip is also closed to form a ring and protects an annular area of the second component.

Furthermore, the first component is preferably a housing and the second component a piston rod of a piston guided in the housing.

The piston rod of a piston guided in the housing is exposed to ambient conditions during retraction and extension. In order to prevent the entry of foreign substances into the interior of the housing, a wiping element is arranged on the housing in such a way that the wiping lip is adjacent to the piston rod. The wiping element is inserted for example into the annular groove of a cylinder. The protective lip protects the external area of the retracted piston rod lying adjacent to the wiping element both during transport and during the painting process.

In a further embodiment, the piston rod exhibits, viewed in cross-section, a polygonal shape, in particular a round or oval shape.

The wiping element as a rule lies adjacent to the whole circumference of the piston rod. Teeth or wedges at the external face of the piston rod can determine the polygonal shape of the cross-section of a piston rod. The wiping element and, as a result, also the protective lip follow the contour of the polygonal shape. In this way, the protective lip and the wiping lip perform their function to the full extent. A round or oval cross-section of the piston rod is advantageous with regard to the arrangement of the wiping element and the fitting and removal of the protective lip.

The wiping element is a single or double wiper in a preferred embodiment of the wiper arrangement according to the invention.

Wiping elements are used for cleaning the piston rod to be retracted in housing-piston units, which often represent a hydraulic system. Single wipers have a wiping lip, which is arranged directed towards the housing exterior. The protective lip is arranged upstream of the wiping lip. Wiping elements can have a further wiping lip, which prevents the exit of oil out of the hydraulic system. So-called double wipers perform a double sealing function, seal off hydraulic fluid towards the interior and keep out foreign substances from the exterior. The protective lip is fitted in front of the outer wiping lip in the case of double wipers.

In a further preferred development of the wiper arrangement according to the invention, the protective lip in the fixed state lies fluid-tight against the piston rod and/or the housing.

A fluid-tight fit of the sealing lip ensures that no fluids, such as for example rain during transport or paint during the painting process, penetrate through the protective lip into the area to be protected. An overlapping protective lip lies adjacent both to the housing and to the piston rod, so that the sealing gap lying around the piston rod is completely overlapped by the protective lip and both an area of the piston rod lying beneath the protective lip and the wiping element arranged in the sealing gap are protected in an ideal manner.

The invention further comprises the use of wiper arrangement including a wiper element made from rubber-elastic or a ductile-elastic material, wherein at least one wiping lip is disposed on the wiper element, wherein the wiper element has a protective lip which is disposed on the wiper element in a detachable fashion and with at least two machine components which move relative to each other, the wiper element being disposed in stable position on a first machine component to seat on a second machine component for the painting of components mobile against one another. In a first step, the wiping element is arranged and, as necessary, the protective lip is fixed to the wiping element, in a second step at least one of the two components mobile against one another is painted, and in a third step the protective lip is detached from the wiping element after the painting process.

With the use of a wiper arrangement according to invention, the protective lip fixed to the arranged wiping element protects the area of the component covered by it against contamination with paint particles during the painting process. It goes without saying that, as a rule, a component other than that against which the protective lip lies adjacent is painted. After the painting, the protective lip is detached and removed. By using a wiper arrangement according to the invention for painting, a system of components mobile against one another can be commissioned without preliminary damage caused by the painting process, in particular without contamination.

Further advantages of the invention emerge from the description and the figures of the drawing. The wiping element according to the invention and the wiper arrangement according to the invention are represented in the examples of embodiment in the figures. The embodiments shown in the figures are shown very much in schematic form and are not to be understood as being to scale. The individual reference numbers are used to designate identical features in the different embodiments.

DESCRIPTION OF THE PREFERRED EMBODIMENT

Figure 1:
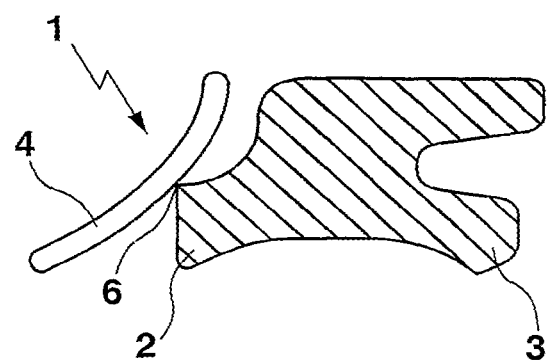
FIGS. 1 and 2 show a cross-section of an exemplary wiping element.

FIG. 1 represents a cross-section of an inventive wiping ring 1 with a wiping lip 2 and a further wiping lip 3. A protective lip 4 is attached at the base-shaped end edge above wiping lip 2. Protective lip 4 is fixed to wiping ring 1 by means of a narrow linear firm bond 6, thereby providing an attachment location 6 between the protective lip 4 and the wiping ring 2e. Protective lip 4 is attached at an inner line, so that protective lip 4 extends not only downwards up to the contact face, but also upwards, and overlaps wiping ring 1 at the front side in a strip-like fashion. The portion of the protective lip extending upwardly from the attachment location 6 thereby forms a grip or strap which can be grasped to remove the protective lip 4 from the wiping ring 1 at the attachment location 6. Accordingly, the protective lip 4 overlaps not only the area of the contact face and wiping lip 2 covered by protective lip 4, but also the upper part of wiping ring 1 such these elements are covered and at least partially protected against influences from the surroundings, such as for example paint particles. Protective lip 4 is made from a rubber-elastic material, which is softer than the material of wiping ring 1. As a result, protective lip 4 exhibits a good sealing behavior with respect to light-viscous fluids and very small particles.

Figure 2:
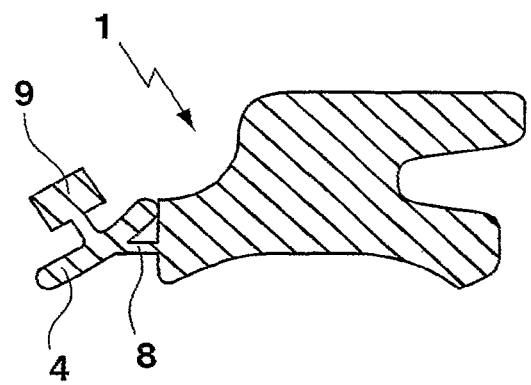

FIG. 2 shows a wiping ring 1 made of a rubber-elastic material designed as a double wiper. A protective lip 4 is provided on an end face, the protective lip being fixed via a web 8 to wiping ring 1. Web 8 accordingly constitutes an attachment location 8 which connects an end face of the wiping ring 1 to the central region of protective lip 4. Protective lip 4 lies at one end adjacent to an imaginary contact face and at the other end adjacent to the upper edge of the end face of wiping ring 1. Provided at the outward-facing side of protective lip 4 is a block-shaped grip 9, with the aid of which protective lip 4 can be detached from wiping ring 1 by tearing off web 8. Grip 9 thereby extends radially outwardly beyond the attachment location 8 and slants axially in a forward direction away from wiping ring 1. Web 8 therefore attaches the overall protective lip 4 to wiping element 1 at the defined and restricted attachment location 8.

Figure 3:
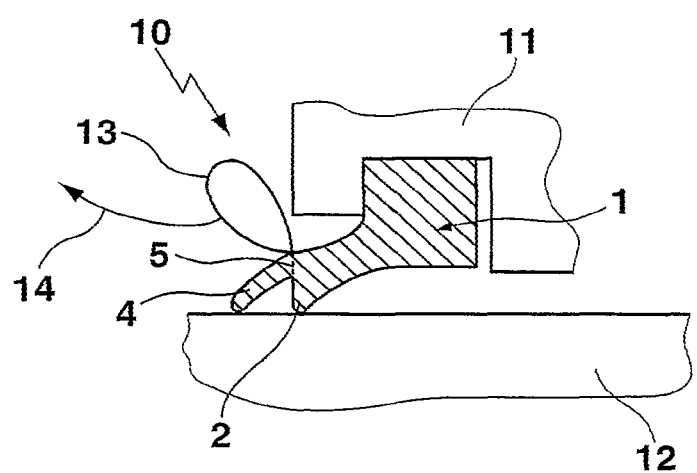
FIG. 3 shows a section through an exemplary arrangement of a wiping element in a housing-piston unit.

FIG. 3 represents a schematic section through a wiper arrangement 10 according to the invention. In housing 11, a wiping ring 1 is inserted in an annular groove and lies in an a annular fashion adjacent to piston rod 12 in the sealing gap between housing 11 and a piston rod 12 of a piston guided in housing 11. Wiping ring 1 has a single wiping lip 2 functioning as a single wiper. A protective lip 4 made of the same material as wiping ring 1 is fixed to wiping ring 1 at the end face above wiping lip 2, the attachment taking place by means of a perforation 5. Provided at the perforation edge is a strap 13, with the aid of which the perforation 5 can be broken through in order to detach protective lip 4. Wiping ring 1 lies with protective lip 4 and wiping lip 2 adjacent to piston rod 12, so that the area between the two contact points is covered by protective lip 4. The overlapping serves for the preservation of that area during transport of wiper arrangement 10 as well as for protection during painting of housing 11. As a result of a fluid-tight fit of protective lip 4 on piston rod 12, no corrosive or paint particles penetrate to the area to be protected. The area of piston rod 12 lying adjacent to wiping lip 2 at the exterior can be run beneath wiping lip 2 due to paint-related temperature differences, as result of which wiping ring 1 and downstream seals become contaminated by dirt and paint particles adhering to piston rod 12 in this area. As a result of this contamination, wiping ring 1 and other seals and components of the housing-piston unit may be damaged and restricted in their function. After coating of housing 11, protective lip 4 is detached from wiping ring 1 by pulling on strap 13 in the direction of arrow 14 and removed from piston rod 12.

The invention relates to a wiping element 1 made from a rubber-elastic or ductile-elastic material for the protection of components mobile against one another, wherein at least one wiping lip 2 is provided on wiping element 1. Wiping element 1 has a protective lip 4, which is or can be fixed in a detachable fashion to wiping element 1. In a wiper arrangement 10, wiping element 1 is arranged position-stable on a first component and lies with wiping lip 2 and protective lip 4 adjacent to a second component. When such a wiper arrangement 10 is used for the painting of components mobile against one another, at least one component is painted in the fixed state of protective lip 4 and protective lip 4 is then detached from wiping element 1.

I claim:

1. A wiping element made from a rubber-elastic or ductile-elastic material for the protection of a first outer and a second inner component, the first and the second components being mobile with respect to one another, the wiping element comprising:
    a wiping ring having at least one wiping lip, said wiping ring extending in a closed annular fashion about said second inner component, said wiping ring structured and dimensioned to be held within an annular groove fashioned in the first outer component and to seat on an outer surface of the second inner component, thereby sealing a gap between the first and the second components;
    a protective lip directly attached to said wiping ring in a detachable fashion at an attachment location; and
    at least one grip or strap attached to and extending radially outward from said protective lip, away from said attachment location, said grip or strap disposed, structured and dimensioned to be grasped and pulled for removing said protective lip from said wiping ring.

2. The wiping element of claim 1, wherein said protective lip is produced from a rubber-elastic or ductile-elastic material.

3. The wiping element of claim 1, wherein said protective lip is made from a same material, a softer material, or a harder material than a material of the wiping ring.

4. The wiping element of claim 1, wherein said protective lip is fixed by means of a firm bond to the wiping ring, said firm bond being uninterrupted, in segments, or a perforation.

5. The wiping element of claim 1, wherein said protective lip is positively locked to said wiping ring.

6. The wiping element of claim 5, wherein said protective lip has one or more projections and said wiping ring has recesses corresponding to a shape of said projections.

7. The wiping element of claim 1, wherein said protective lip, in a fixed state thereof, at least partially overlaps said wiping lip.

8. A wiper device comprising the wiping element of claim 1 and with at least two components mobile with respect to one another, wherein the wiping element is arranged position-stable on a first component and seats on a second component.

9. The wiper device of claim 8, wherein the wiping element seats on said second component in an annular fashion.

10. The wiper device of claim 8, wherein said first component is a housing and said second component is a piston rod of a piston guided in said housing.

11. The wiper device of claim 10, wherein said piston rod, viewed in cross-section, has a polygonal, round or oval shape.

12. The wiper device of claim 11, wherein the wiping element is a single wiper or a double wiper.

13. The wiper device of claim 10, wherein said protective lip, in a fixed state thereof, lies fluid-tight against the piston rod and/or said housing.

14. A method for coating or transporting at least two machine components, which move with respect to each other during operation thereof, using the wiper element of claim 1, the method comprising the steps of:
    a) disposing the wiping ring with fixed protective lip on at least one of the first and the second machine component;

b) coating at least one of the first and the second machine components or transporting the first and second machine components;
c) detaching the protective lip from the wiping ring following step b); and
d) commissioning the two machine components together with the wiping ring following step c).

* * * * *